(12) United States Patent
Vitt et al.

(10) Patent No.: US 11,304,001 B2
(45) Date of Patent: Apr. 12, 2022

(54) SPEAKER EMULATION OF A MICROPHONE FOR WIND DETECTION

(71) Applicant: Apple Inc., Cupertino, CA (US)

(72) Inventors: Nikolas T. Vitt, Redwood, CA (US); Joyce E. Gorny, Mountain View, CA (US); Thomas M. Jensen, San Francisco, CA (US); Jeffrey N. Gleason, San Francisco, CA (US); Tyrone T. Chen, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/872,076

(22) Filed: May 11, 2020

(65) Prior Publication Data
US 2020/0396539 A1    Dec. 17, 2020

Related U.S. Application Data

(60) Provisional application No. 62/861,246, filed on Jun. 13, 2019.

(51) Int. Cl.
*H04R 3/04* (2006.01)
*G01P 5/00* (2006.01)

(52) U.S. Cl.
CPC ............ *H04R 3/04* (2013.01); *G01P 5/00* (2013.01); *H04R 2410/07* (2013.01)

(58) Field of Classification Search
CPC ............ H04R 2410/07; H04R 2460/01; H04R 1/1083; H04R 3/04; H04R 25/407;
(Continued)

(56) References Cited

U.S. PATENT DOCUMENTS

| 5,343,744 A | 9/1994 | Ammann |
| 5,979,234 A | 11/1999 | Karlsen |

(Continued)

FOREIGN PATENT DOCUMENTS

| CN | 107636758 A | 1/2018 |
| CN | 109845287 A | 6/2019 |

(Continued)

OTHER PUBLICATIONS

"TFA9872_SDS—High Efficiency Class-D Audio Amplifier with Speaker-as-Microphone—Product Short Datasheet" Apr. 12, 2017, NXP Semiconductors.

(Continued)

*Primary Examiner* — Norman Yu
(74) *Attorney, Agent, or Firm* — Womble Bond Dickinson (US) LLP

(57) ABSTRACT

A method for detecting wind using a microphone and a speaker of an electronic device. The method obtains a microphone signal produced by the microphone. The method obtains a speaker input signal produced by the speaker that is emulating a microphone capturing ambient sound in an environment through the speaker. The method determines a coherence between the microphone signal and the speaker input signal and determines whether the coherence is below a coherence intensity threshold. In response to determining that the coherence is below the coherence intensity threshold, the method determines a presence of wind in the environment.

20 Claims, 5 Drawing Sheets

(58) Field of Classification Search
CPC .............. G10L 21/0216; G10L 21/0264; G10L 21/0208; G10L 25/51; G10L 21/02; G10L 25/06; G10K 2210/3018
USPC ........ 381/94.1, 94.2, 317, 71.1, 56, 98, 107, 381/57, 58, 94.7; 455/570
See application file for complete search history.

(56) References Cited

U.S. PATENT DOCUMENTS

| | | | |
|---|---|---|---|
| 8,781,137 | B1 | 7/2014 | Goodwin |
| 10,586,523 | B1* | 3/2020 | Kohler ............. G10K 11/17833 |
| 10,721,562 | B1* | 7/2020 | Rui ........................ H04R 3/005 |
| 2008/0088819 | A1 | 4/2008 | Metzger et al. |
| 2009/0238369 | A1* | 9/2009 | Ramakrishnan ....... H04R 3/005 381/56 |
| 2012/0316872 | A1 | 12/2012 | Stoltz et al. |
| 2014/0126729 | A1 | 5/2014 | Heiman et al. |
| 2015/0208176 | A1* | 7/2015 | Melanson .............. H04R 19/02 381/174 |
| 2015/0316575 | A1 | 11/2015 | Shams et al. |
| 2017/0085233 | A1 | 4/2017 | Berkhout et al. |
| 2017/0118556 | A1 | 4/2017 | Macours |
| 2018/0084358 | A1 | 3/2018 | Tisch et al. |
| 2018/0146287 | A1 | 5/2018 | Song et al. |
| 2019/0043520 | A1* | 2/2019 | Kar ..................... G10L 21/0232 |
| 2019/0230433 | A1* | 7/2019 | Okuda .................. H04R 1/222 |
| 2019/0253795 | A1 | 8/2019 | Ozcan et al. |

FOREIGN PATENT DOCUMENTS

| | | |
|---|---|---|
| CN | 109845289 A | 6/2019 |
| WO | WO 2007/107341 A1 | 9/2007 |

OTHER PUBLICATIONS

First Office Action of the China National Intellectual Property Administration dated Jul. 1, 2021 for related Chinese Patent Application No. 202010535829.7.

Notice of Preliminary Rejection of the Korean Intellectual Property Office dated Mar. 12, 2021 for Korean Patent Application No. 10-2020-0064100.

* cited by examiner

SPEAKER EMULATION OF A MICROPHONE FOR WIND DETECTION

CROSS-REFERENCE TO RELATED APPLICATION

This application claims priority to and benefit of U.S. Provisional Patent application No. 62/861,246, filed Jun. 13, 2019, the disclosure of which is incorporated herein by reference.

FIELD

An aspect of the disclosure relates to wind detection using a microphone and a speaker that emulates a microphone. Other aspects are also described.

BACKGROUND

Acoustic noise may be any unwanted (or unpleasant) sound that is produced in an acoustic domain. Such noise is unwanted when it interferes with a person's ability to listen to other sounds (e.g., music) that are being produced simultaneously by playback on an audio device (e.g., a laptop computer, a tablet computer). To reduce the effect of noise, active noise cancellation (ANC) systems may be utilized. These systems use one or more microphones to sense ambient sound, from which the ANC system produces an anti-noise signal that is similar to the noise but opposite in phase. This signal is then outputted through a speaker to cancel the noise through destructive interference.

SUMMARY

An aspect of the disclosure is a method performed by an electronic device for using a microphone and a speaker for detecting the presence of wind. To perform wind detection, the device obtains a speaker input signal produced by the speaker that is emulating a microphone by sensing ambient sound. The device determines a coherence between an obtained a microphone signal produced by the microphone and the speaker input signal. Coherence represents a linear relationship between the two signals with respect to frequency. When coherence is high, both signals are similar, whereas when coherence is low both signals may vary. Coherence in general may drop in the presence of wind due to the decorrelated nature of wind. Thus, in response to determining that the coherence drops below a threshold, the device declares the presence of wind in the environment.

In one aspect, the device may perform wind detection upon determining that the device is in a noisy environment. Specifically, in order to reduce power consumption required to activate the speaker (and/or an amplifier of the speaker) to produce the speaker input signal, the device may first determine if there is a sufficient amount of background noise contained within the microphone signal. Otherwise, if there is very little noise in the microphone signal, noise attributed to wind may be negligible. The device estimates noise contained within the microphone signal, and compares the noise to a noise threshold. Thus, when the noise estimate is above the threshold, the device may perform wind detection, since there is a likelihood that the increase in noise may be attributed to wind noise.

In another aspect, in addition to detecting the presence of wind, the device may determine a speed of the wind based on the coherence between the microphone signal and the speaker input signal. As previously mentioned, coherence is a linear relationship between both signals. The coherence between the signals may decrease as the speed of the wind increases because as the speed increases the wind may become more decorrelated. As a result, different coherences may be predefined, each associated with a different wind speed. The device may compare a current coherence between the two signals with the predefined coherences to identify a wind speed associated with a matching coherence.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description.

Many devices, such as smart phones, include microphones that are used to capture sound for many different purposes. For example, a user may conduct a telephone conversation through the device, in which a microphone of the device captures speech as an uplink signal. The intelligibility of the speech in the signal may be detrimentally affected by other sounds within the environment, such as noise and wind. To combat the effect of wind, the device may include a wind detection system that detects wind by determining whether the cross-correlation between two microphone signals produced by different microphones is below a threshold. If so, the system may modify the signals based on the presence of wind. Some smaller devices, however, may not be able to take advantage of such a system. These devices may have small housings with limited internal capacity that may not be able to include as many electronic components as other bigger devices. For instance, these smaller devices may have only enough space for one microphone and one speaker. In this case, wind detection systems may be ineffective.

To overcome these deficiencies, the present disclosure describes an electronic device that is capable of detecting wind with the use of a microphone and a speaker. Specifically, the electronic device causes the speaker to emulate a microphone in order to produce a speaker input signal of ambient sound sensed by the speaker. The electronic device determines the presence of wind based on the coherence between a microphone signal produced by the microphone and the speaker input signal. Thus, such an electronic device is able to detect wind by using a speaker that emulates a microphone, thereby alleviating the need of at least two microphones that would otherwise be needed for some wind detection systems.

Figure 1:
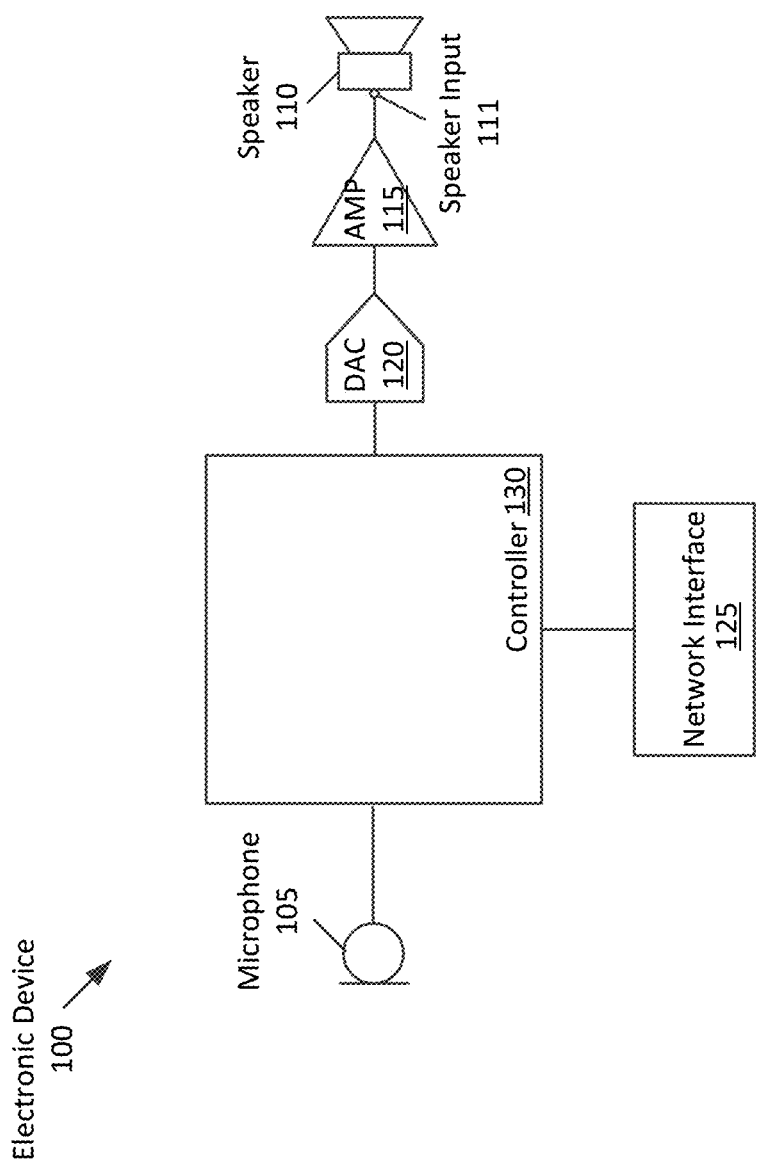
FIG. 1 shows a block diagram of an electronic device according to one aspect of the disclosure

FIG. 1 shows a block diagram of an electronic device 100 of one aspect that performs wind detection. The electronic device 100 includes a microphone 105, a speaker 110, an amplifier (AMP) 115, a digital-to-analog converter (DAC) 120, a network interface 125, and a controller 130.

The electronic device may be any electronic device that includes a speaker and a microphone (e.g., integrated therein), such as a desktop computer, a home audio system, any consumer electronics device with audio capability, and an audio system in a vehicle (e.g., an automobile infotainment system). In one aspect, the electronic device may be a wireless portable device, such as a wearable device (e.g., smart glasses, smart watch, etc.), a hearable device (e.g., wireless headphones, such as in-ear, on-ear, or over-ear headphones), a smartphone, a tablet, or a laptop. The electronic device may be wireless such that it can establish a wireless connection link, via a network interface 125, using any wireless communication method (e.g., using BLUETOOTH protocol, a wireless local network link, etc.) with another electronic device in order to exchange data packages (e.g., Internet Protocol (IP) packets). In one aspect, the network interface 125 is configured to establish the wireless communication link with a wireless access point in order to exchange data with an electronic server over a wireless network (e.g., the Internet).

In another aspect, the electronic device may be a small device having a housing, within which at least some of the elements described herein are integrated. For example, the electronic device 100 may be a smart watch with a housing that at least includes (e.g., integrated therein) the microphone 105, the speaker 110, and the controller 130 that is configured to perform wind compensation operations, as described herein. In one aspect, the housing may have a surface area ranging from 1 cm² to 150 cm². In one aspect, the housing may be generally rectangular in shape, while in another aspect the housing may have any shape.

The microphone 105 may be any type of microphone (e.g., a differential pressure gradient micro-electro-mechanical system (MEMS) microphone) that is configured to convert acoustical energy caused by sound wave propagating in an acoustic environment into an input microphone signal. The speaker 110 may be an electrodynamic driver that may be specifically designed for sound output at certain frequency bands, such as a woofer, tweeter, or midrange driver, for example. In one aspect, the speaker 110 may be a "full-range" (or "full-band") electrodynamic driver that reproduces as much of an audible frequency range as possible. In one aspect, the electronic device 100 may include more than one microphone and/or more than one speaker.

The controller 130 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller is configured to perform wind detection operations. In one aspect, the controller 130 is further configure to perform wind compensation operations, such as audio signal processing operations upon the microphone signal produced by the microphone 105. More about these operations are described herein. In one aspect, operations performed by the controller 130 may be implemented in software (e.g., as instructions stored in memory and executed by the controller 130) and/or may be implemented by hardware logic structures as described herein.

In one aspect, the controller 130 is configured to obtain an input audio signal (as an analog or digital signal) of a piece of audio program content (e.g., music, etc.) for playback through the speaker 110. In one aspect, the controller 130 may obtain the input audio signal from local memory, or the controller 130 may obtain the input audio signal from the network interface 125, which may obtain the signal from an external source. The audio signal may be a signal input audio channel (e.g., mono). In another aspect, the controller 130 may obtain two or more input audio channel (e.g., stereo) for output through two or more speakers. In one aspect, in the case in which the device 100 includes two or more speakers, the controller 130 may perform additional audio signal processing operations. For instance, the controller 130 may spatially render the input audio channels to produce binaural output audio signals for driving at least two speakers (e.g., a left speaker and a right speaker of the device 100). In another aspect, the controller 130 may include a sound output beamformer that is configured to produce speaker driver signals which when driving two or more speakers produce spatially selective sound output. Thus, when used to drive the speakers, the device 100 may produce directional beam patterns that are directed to locations within the environment.

The DAC 120 is to receive the input audio signal as an output digital audio signal that is produced by the controller 130 and is to convert it into an analog signal. The AMP 115 is to obtain the analog signal from the DAC 120 and is to provide a drive signal to the speaker input 111 of the speaker 110. Although the DAC and AMP are shown as separate blocks, in one aspect the electrical circuit components for these may be combined in order to provide for a more efficient digital to analog conversation and amplification operation of the driver signal, e.g., using class D amplifier technology. The speaker 110 is to obtain the driver signals from the AMP 115 (via the input 111) and is to use the driver signals to produce sound. As will be described herein, in addition to producing sounds, the speaker 110 may be configured to emulate a microphone by sensing ambient sound and converting it into a speaker input signal. More about emulating a microphone is described herein.

In one aspect, the electronic device 100 may be a part of a computer system, as disclosed herein, that includes a separate (e.g., companion) device, such as a smart phone, with which the electronic device 100 establishes a (e.g., wired and/or wireless) connection in order to pair both devices together. In one aspect, the (e.g., programmed processor of the) companion device may perform one or more of the operations described herein, such as audio processing operations and wind detection operations. For instance, the companion device may obtain a microphone signal and/or speaker input signal from the electronic device 100, and perform wind detection operations, as described herein. In another aspect, at least some of the elements of the electronic device 100 described herein (e.g., the microphone 105, the speaker 110, etc.) may be a part of different electronic devices within the computer system. For instance, the speaker 110 may be a standalone speaker. In this case, the different electronic devices may communicate with the electronic device 100 and/or each over via a wireless or wired communication link.

Figure 2:
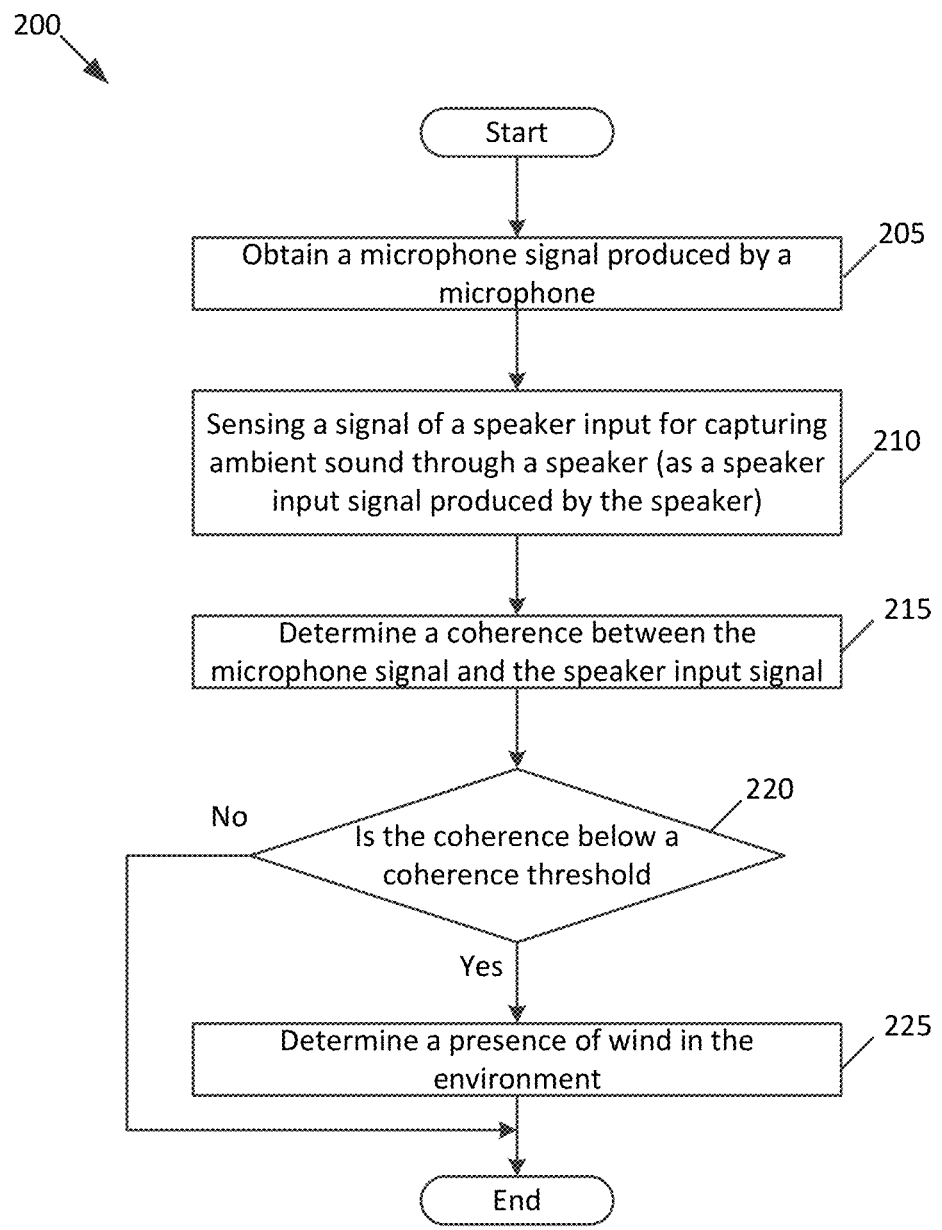
FIG. 2 shows a flowchart of one aspect of a process to perform wind detection.

FIG. 2 is a flowchart of one aspect of a process 200 to perform wind detection. In one aspect, the process 200 is performed by the controller 130 of the electronic device 100 of FIG. 1. The process 200 begins by obtaining a microphone signal produced by a microphone (at block 205). For example, the microphone may be a part of (or integrated into) the electronic device (as previously described) and may sense ambient sound of the environment and convert the sound into the microphone signal. In another aspect, the microphone signal may be produced by a microphone that is a part of the companion device. The process 200 senses a signal of a speaker input for capturing ambient sound through the speaker (as a speaker input signal produced by the speaker) (at block 210). Specifically, the controller may obtain the speaker input signal produced by the speaker that is emulating a microphone capturing the ambient sound in the environment through the speaker. In one aspect, the microphone signal may be different (e.g., have a different spectral shape, etc.) than the speaker input signal. The difference between the signals may be due to for example differences in specifications of both elements and the fact that both elements may be integrated at different locations within (or on) the electronic device. For instance, the speaker input signal may represent a first ambient sound sensed by the speaker and the microphone signal may represent a second ambient sound sensed by the microphone. The process 200 determines coherence (or magnitude-squared coherence) between the microphone signal and the speaker input signal (at block 215). The process 200 determines if the coherence is below a coherence threshold (at decision block 220). If so, the process 200 determines (or is said to detect) a presence of wind within the environment (at block 225). Otherwise, the process 200 ends.

Some aspects perform variations of the process 200. For example, the specific operations of the process 200 may not be performed in the exact order shown and described. The specific operations may not be performed in one continuous series of operations and different specific operations may be performed in different aspects. For instance, in one aspect, rather than ending the process 200 if the coherence is not below the coherence threshold, the process 200 may return to block 210 (or block 205) to continue to monitor the signals in order to detect the presence of wind.

As another example, as described herein, the process 200 may also perform wind compensation operations upon the detection of wind. For instance, in one aspect, the controller may perform spectral shaping of the microphone signal from the microphone in order to minimize an increase in low frequency components that are due to the presence of wind. More about the operations performed upon by the controller is further described herein.

Figure 3:
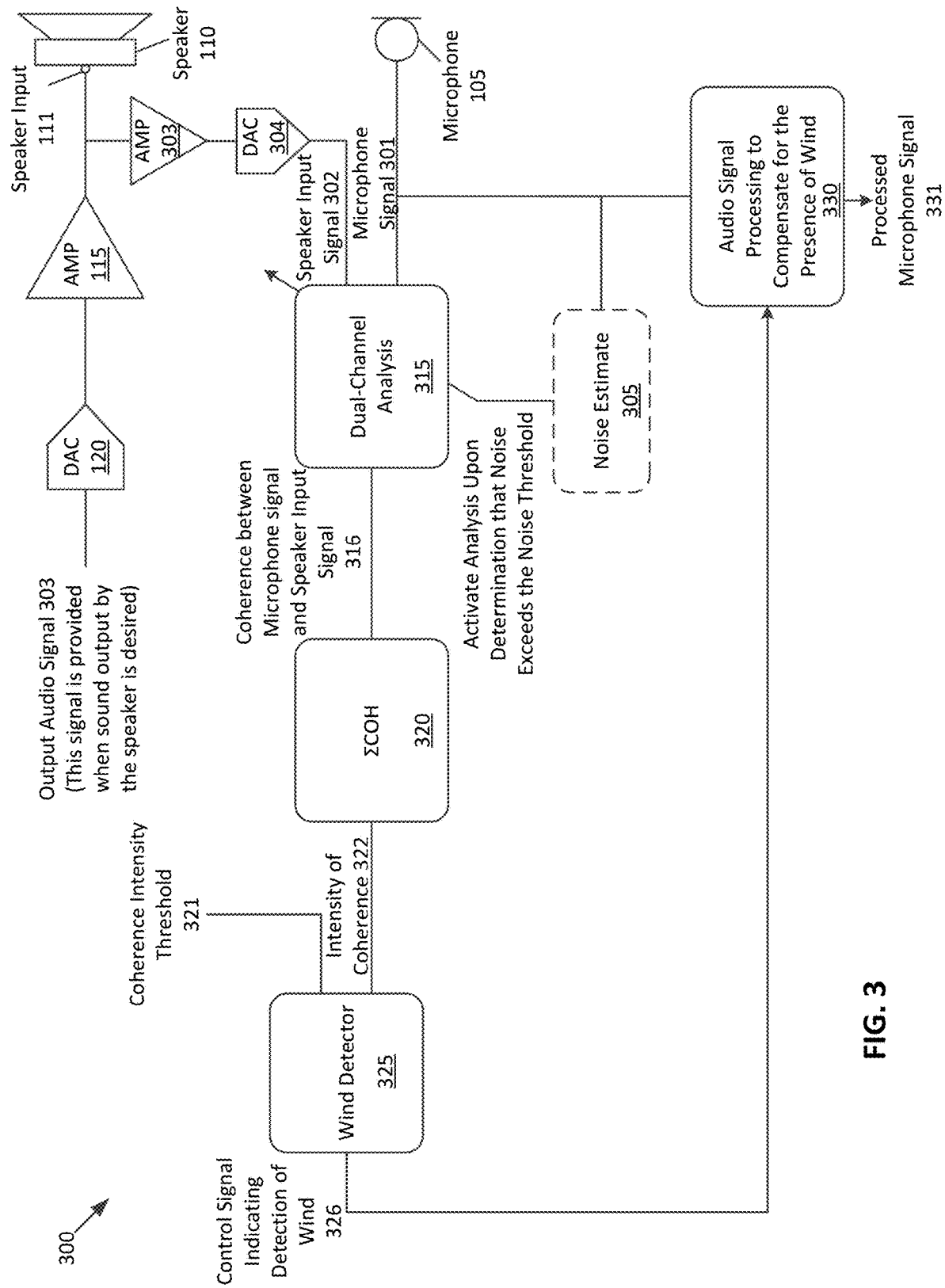
FIG. 3 is a block diagram of operations to detect the presence of wind using a microphone signal and a speaker input signal according to one aspect of the disclosure.

FIG. 3 shows a block diagram 300 of the operations performed by the electronic device (e.g., a controller of the electronic device such as controller 130 shown in FIG. 1) to detect the presence of wind using a microphone signal 301 and a speaker input signal 302 according to one aspect. The block diagram 300 will be described with reference to FIGS. 1-2. The block diagram 300 includes at least some elements of the electronic device 100 of FIG. 1. As illustrated, the diagram 300 includes the microphone 105, the speaker 110, the AMP 115, and the DAC 120.

The block diagram 300 begins by determining whether a noise estimate of the microphone signal 201 captured by the microphone 105 is at or above (exceeds) a noise threshold (at block 305). Specifically, the controller 130 determines a noise estimate contained within the microphone signal 201, and compares the noise estimate to a noise threshold. In one aspect, the controller 130 performs this operation to initialize wind detection when there is actual background noise present in the environment. For instance, if there is little to no background noise (e.g., noise below the threshold), it may be assumed that noise caused by wind is not present or is negligible. As a result, the controller may compare a signal level of the microphone signal to the noise threshold. In one aspect, the controller may compare a sound pressure level (SPL) of the microphone signal to a noise SPL threshold. Specifically, the controller may compare broadband noise captured by the microphone with a predefined threshold. For instance, since most naturally occurring sounds occur at low frequencies, the noise threshold may be a sound energy level over such frequency components. The controller may determine the noise estimate as sound energy levels of the microphone signal over those same frequency components, and compare the noise estimate with the threshold. In one aspect, the comparison of sound energy levels may be based on per frequency component or may be based on a combination of sound energy levels over two or more frequency components.

Upon determining that the noise estimate of the microphone signal 301 is at or above the noise threshold, the controller 130 may perform operations to cause the speaker 110 to emulate a microphone in order to capture a speaker input signal produced by the speaker 110. In some aspects, the controller may activate (e.g., wake up) the speaker 110 (and/or any control circuitry that is configured to produce the speaker input signal) to begin sensing sound by emulating a microphone. In this case, the controller may reduce power consumption of the device by only waking up the speaker 110 in the presence of loud noise that is sensed by the microphone signal (e.g., noise above the threshold).

In contrast to conventional speaker operation, while the speaker is in a microphone emulation mode, the controller may prevent the speaker 110 from producing sound in order to obtain the speaker input signal. In particular, while the speaker input signal is being sensed, the AMP 115 is not driving the speaker 110. This can be achieved in one or more ways. For instance, the controller can cease providing the DAC 120 with an output (e.g., digital) audio signal 303 in order to prevent the AMP 115 from driving the speaker to produce sound. As another example, the controller may only capture the speaker input signal during times during which the AMP 115 is not driving the speaker 110 to produce sound. For instance, the speaker input signal may be sensed between an ending of a song that is being played back by the device 100 and before a next song begins.

In one aspect, the speaker input signal 302 is a digital signal that is produced while the speaker 110 is emulating a microphone. For example, an AMP 303 is coupled to the speaker input 111 and is to receive an electrical (analog) signal produced by the speaker 110. The AMP 303 amplifies the signal and sends the amplified signal to a DAC 304 that produces a digital audio signal as the speaker input signal 302. As another example, the controller 130 may obtain the speaker input signal directly from the speaker 110. For instance, the controller may measure (or sense) a (e.g., voltage) signal across the speaker input 111 of the speaker 110 in order to capture the speaker input signal. In another aspect, the controller 130 may measure the voltage across the AMP 115 to obtain the speaker input signal 302.

After capturing the microphone signal 301 from microphone 105 and the speaker input signal 302 from the speaker 110, the dual-channel analysis is activated (or initiated) (at block 315). In one aspect, the controller performs dual-channel analysis to measure linear relationships between the speaker input signal and the microphone signal. For instance, the analysis may determine a coherence 316 that may be a function of a statistical measurement of similarities between the two signals with respect to frequency.

In one aspect, the coherence is determined over a first frequency range that is known to be affected, or have an increase in spectral content in the presence of wind noise. In one aspect, the frequency range may be between 1-10 k Hz, or more particularly between 1-10 k Hz.

Coherence between two signals can be calculated in any suitable manner. In one aspect, coherence between two signals x(t) and y(t) may be defined as:

$$C_{xy}(f) = |G_{xy}(f)|^2 / G_{xx}(f) G_{yy}(f)$$

where $G_{xy}(f)$ is the cross-spectral density between x(t) and y(t), and $G_{xx}(f)$ and $G_{yy}(f)$ are the autospectral densities (or power spectral densities) of x(t) and y(t), respectively. $G_{xy}(f)$ provides a value between 0 and 1, at frequency f. Specifically, the values of coherence will always satisfy $0 \leq C_{xy}(f) \leq 1$, where unity indicates that both signals x(t) and y(t) are identical. Two random uncorrelated signals, however, will result in a coherence of 0. In between 0 and 1 represents a correlation or dependency between x(t) and y(t). In one aspect, x(t) may correspond to the speaker input signal 302 and y(t) may correspond to the microphone signal 301.

In another aspect, coherence can be defined as a relationship between two signals in a linear system, and the linear system may be represented as a transfer function (or frequency response, H(f)) between the speaker 110 and the microphone 105. Since the locations of the speaker and microphone are fixed (e.g., integrated into the housing of the device), the H(f) may be predefined (e.g., in a controlled setting, such as a laboratory).

In yet another aspect, rather than being predefined, the frequency response H(f) may be determined from a measured impulse response. For instance, the speaker 110 may output a stimulus sound (e.g., an impulse or a suitable stimulus such as a sine sweep that is sensed by the microphone and used to measure an impulse response). With a known frequency response HO, the coherence between the two signals may be defined as $$C_{xy}(f) = H(f) G_{xy}^*(f) / G_{yy}^*(f)$$

where $G_{xy}^*(f)$ is the complex conjugate of the cross-spectral density. Thus, the coherence may be determined based on the known frequency response, H(f), and estimated (or determined) power spectral densities of the two signals x(t) and y(t).

In one aspect, the operations performed at block 305 may be omitted in order to detect wind. In this case, the dual-channel analysis 315 may constantly or intermittently (e.g., every five seconds) be performed upon the microphone signal 301 speaker input signal 302 in order to detect the presence of wind. In another aspect, these operations may be performed while the speaker 110 is not producing sound.

Based on the coherence that is determined from the dual-channel analysis, the controller 130 determines an intensity of coherence 322 (or coherence intensity) over a second frequency range of the determined coherence (at block 320). In one aspect, the second frequency range may or may not be the same as the first frequency range.

The controller 130 may perform any known method to determine the coherence intensity 322. In one aspect, the controller may integrate the coherence over the second frequency range, resulting in a coherence intensity value in the logarithmic domain.

In another aspect, the coherence intensity may be a function of time. For example, the controller may perform an inverse Laplace transform of the coherence determined at block 315 over the second frequency range to yield the coherence intensity as a function of time. In yet another example, the coherence intensity value may be an average, a median, or a mean of the coherence determined at block 315 over the second frequency range.

At block 325, the controller 130 may determine whether there is a presence of wind. In one aspect, the controller may determine that there is wind when the coherence intensity is less than a coherence intensity threshold 321. The coherence intensity threshold may be determined in any suitable manner. For example, the coherence intensity threshold may be a value learned through the use of a machine learning algorithm. For instance, the algorithm may learn the threshold based on user input, indicating that there is an undesirable presence of wind noise for a coherence intensity. As another example, rather than being a single value, the coherence intensity threshold may be a function of time. As yet another example, the coherence intensity threshold may be predetermined in a controlled environment. In particular, the coherence intensity threshold may be a coherence intensity value that is derived from the coherence between the microphone signal and the speaker input signal, when there is no presence of wind.

In one aspect, wind detection at this stage may be based on the coherence that is determined at block 315, rather than the coherence intensity. For instance, the controller 130 may compare the coherence to a coherence threshold (e.g., a function of coherence with respect to frequency or a coherence value). If the coherence is less than the coherence threshold, the controller 130 determines the presence of wind. In another aspect, as a result of this determination, the diagram 300 may omit the operations of block 320, since the determination may be based on the coherence between the microphone signal 301 and the speaker input signal 302.

Figure 5:
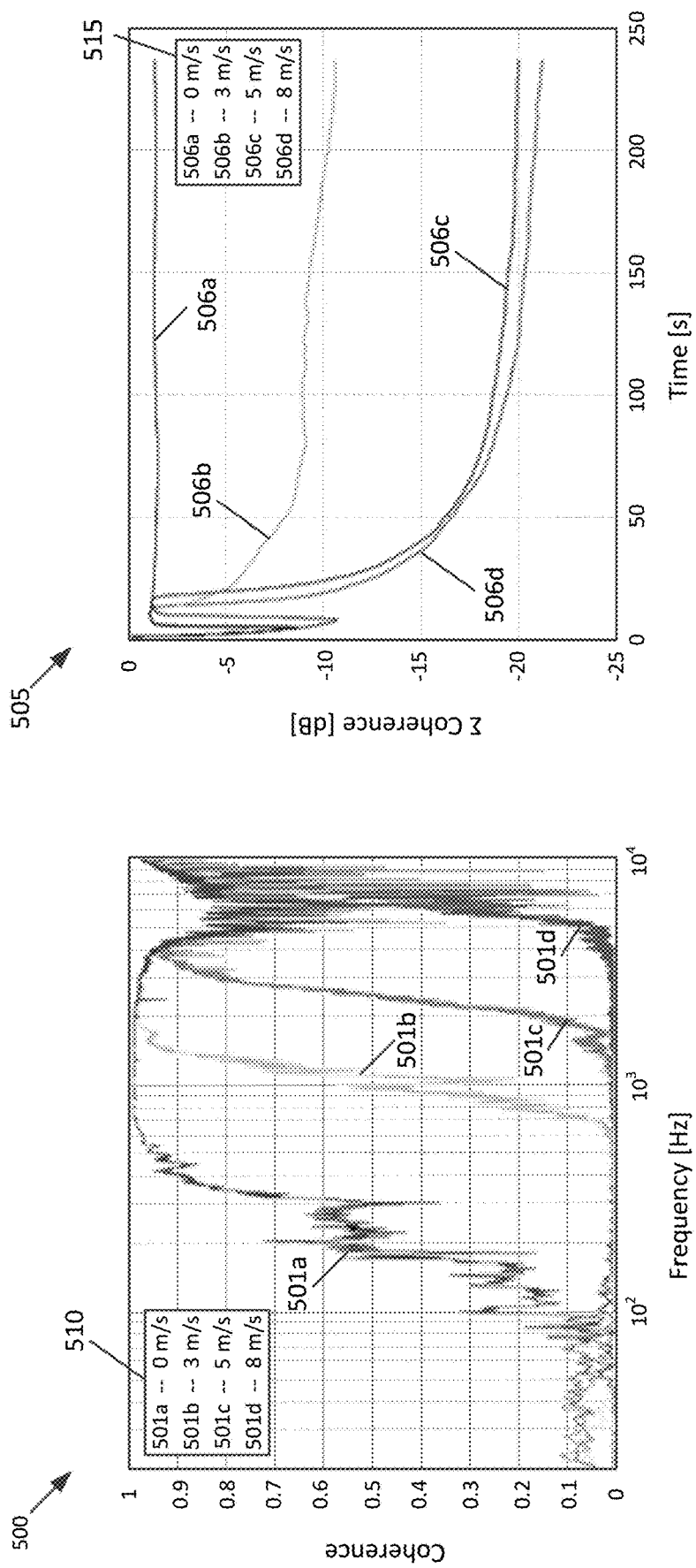
FIG. 5 shows the effect of different wind speeds on coherence between the microphone signal and the speaker input signal according to one aspect of the disclosure.

For instance, referring to FIG. 5, the effect of different wind speeds on coherence between the microphone signal 301 and the speaker input signal 302 is shown according to one aspect of the disclosure. Specifically, this figure illustrates two graphs 500-505, each showing coherence between the microphone signal and the speaker input signal and a corresponding coherence intensity at different wind speeds. Graph 500 shows four coherence curves 501a-501d as functions of coherence with respect to frequency. Coherence curve 501a represents the coherence between the two signals in the absence of wind (e.g., wind at 0 m/s) and coherence curves 501b-501d each represents the coherence at different increments of wind speed as experienced by a speaker (e.g., speaker 110) and/or a microphone (e.g., microphone 105). Graph 505 shows four curves of coherence intensity that each correspond to different coherence curves of graph 500 as functions of time. In one aspect, the coherence intensity curves 506a-506d each corresponds to curves 501a-501d, respectively.

In one aspect, the coherence curve 501a and/or the corresponding coherence intensity curve 506a may be used to define the coherence intensity threshold 321 that is used to detect the presence of wind. For example, if a curve (or function) of a coherence intensity deviates from (e.g., decreases or is below) curve 506a, the controller may determine that there is a presence of wind. As illustrated in graph 500, due to the sensitivity characteristics of the speaker, as it emulates a microphone there is a declining coherence below the speaker's resonance frequency (e.g., between 700-800 Hz). In the presence of wind, however, the coherence below the resonance degrades as a function of wind speed. This is further illustrated in graph 505, as the intensity of coherence curves droops further below curve 506a as the speed of wind increases. In some aspects, curves 501a and 506a may represent a scenario in which there is high background noise in the environment (e.g., when the noise estimate is above the noise threshold), but with little to no wind. In one aspect, there may be different sets of curves based on different levels of the noise estimate.

Each of the curves (or functions) in graphs 500 and/or 505 may be determined in a controlled environment, where coherence is determined for different controlled wind speeds. Each of the curves may then be stored in local memory of the device. In some aspects, more or less curves may be stored, each associated with a different wind speed.

Referring back to FIG. 3, based on the determining that there is wind presence, the controller 130 may produce a control signal 326 indicating that wind was detected. In one aspect, the control signal may include a Boolean value, e.g., "1" declaring that wind has been detected based on the coherence intensity being less than the threshold, or "0" declaring that wind has not been detected based on the coherence intensity being more than the threshold.

When wind is detected, the controller performs audio signal processing to compensate for the presence of wind (at block 330). As one example, the controller may process the microphone signal 301 to improve the intelligibility of speech contained in the microphone signal 301. For instance, during a telephone conversation, the controller may perform noise suppression operations upon the microphone signal 301 based on the detection of wind. Specifically, the controller may spectrally shape the microphone signal by attenuating (or boasting) portions of the signal. For example, the controller may attenuate the microphone signal's low frequency content, since most wind noise resides in the low frequency range. In other aspects, the controller may apply audio processing filters upon the microphone signal, such as low-pass, high-pass, or band-pass filters according to the noise. In some aspects, the controller may perform a gain adjustment to the microphone signal, based on the presence of wind noise. As another example, applications that rely on speech recognition algorithms, such as speech-to-text applications and virtual personal assistant applications may have a high word error rate in the presence of wind. Thus, upon determining that wind is detected, these applications may compensate for wind by applying signal processing operations (as described above) in order to improve the word error rate. In other aspects, the controller may monitor the wind and noise conditions (e.g., SPL levels) and transmit to one or more other applications or other devices for further processing for any purpose.

Figure 4:
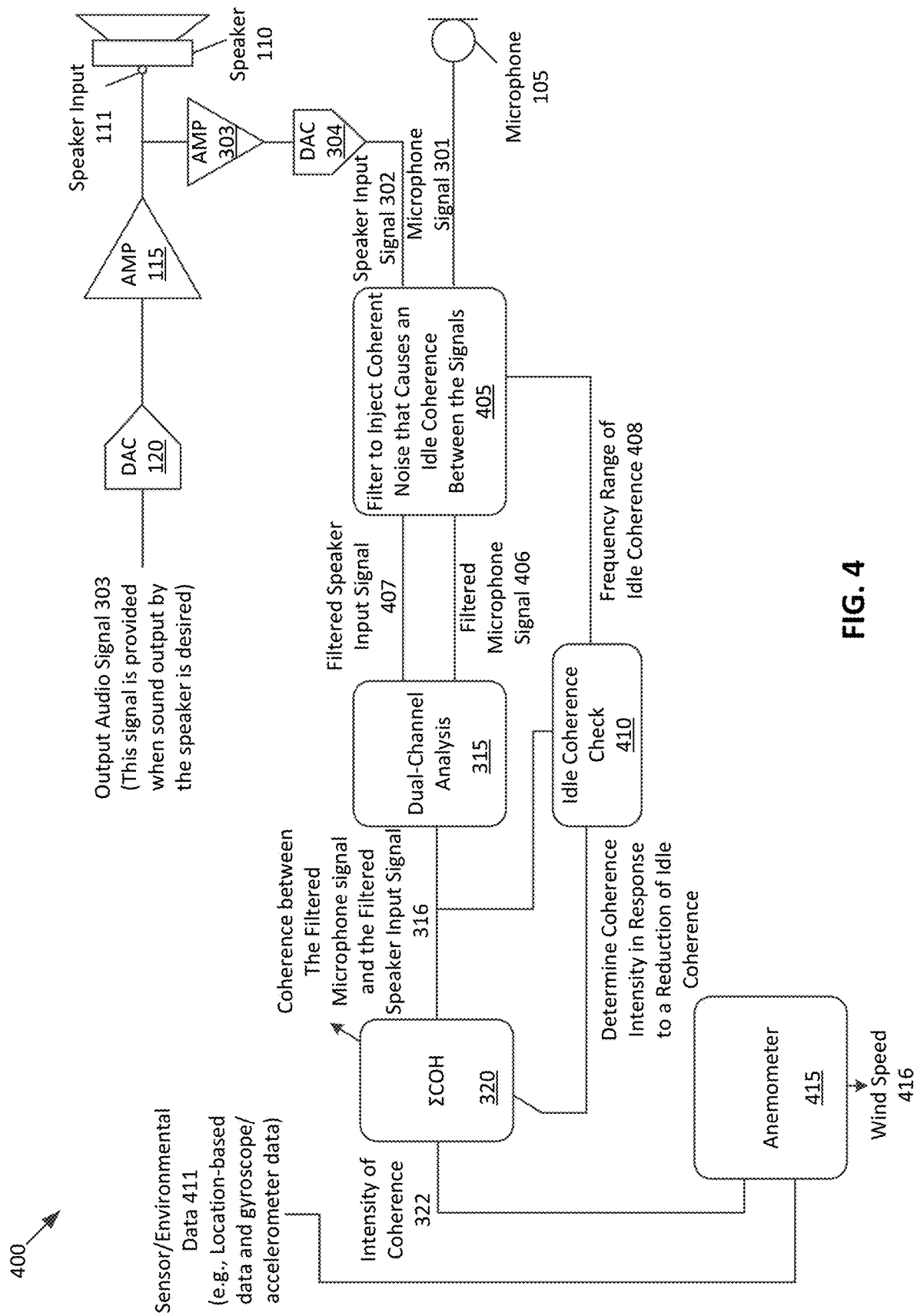
FIG. 4 is a block diagram of operations to determine wind speed using the microphone signal and the speaker input signal according to one aspect of the disclosure.

FIG. 4 shows a block diagram 400 of the operations performed by the (e.g., controller of the) electronic device 100 shown in FIG. 1 to determine wind speed according to one aspect. The block diagram 400 will be described with reference to FIGS. 1-3. For example, at least some of the operations described in diagram 400 may be performed with reference (or similar) to operations performed in diagram 300 of FIG. 3.

As described in FIG. 3, wind detection operations may be triggered when the noise estimate determined at block 305 is above a noise threshold. In this case, the controller 130 may perform wind detection only when there is a sufficient amount of background noise. If, however, wind was present in an environment in which ambient noise is low (e.g., below the noise threshold), the controller may not initiate wind detection. Thus, in one aspect diagram 400 describes operations that allow the controller to perform wind speed detection (and/or wind detection) in non-noisy environments. To do this, the block diagram 400 begins with the controller obtaining the microphone signal 301 and the speaker input signal 302, and filtering the signals to inject (or add) internal coherence (or coherent noise) that causes an idle coherence between the signals (at block 405). Specifically, the controller may apply a pre-shaped filter to both signals to inject spectral content therein to produce a filtered microphone signal 406 and a filtered speaker input signal 407. In one aspect, the pre-shaped filter may be applied to certain frequency components of each signal, such as low-frequency components that are normally affected by wind noise. By injecting spectral content in the same frequency components of each signal, an idle coherence may be defined at a certain coherence (e.g., 1, 0.9, 0.8, etc.).

The controller 130 performs dual-channel analysis 315 to determine the coherence between the filtered microphone signal 406 and the filtered speaker input signal 407. Upon determining the coherence, the controller 130 performs an idle coherence check to determine whether there is a change in the idle coherence over the frequency range 408 in which the coherent noise was added to the signals 302 and 301 (at block 410). Specifically, the controller 130 determines whether there is a reduction in the idle coherence that is indicative of the presence of wind. Thus, during times at which wind is not present, the idle coherence between the two filtered signals will be high or remain the same. Once wind is present, however, the idle coherence between the two filtered signals will drop, due to the decorrelated nature of wind noise. Therefore, the controller 130 can determine the presence of wind in a non-noisy (and in a noisy) environment based on a reduction to the idle coherence. In one aspect, to detect a reduction in the idle coherence, the controller determines whether the idle coherence falls below an idle coherence threshold value, which may be a percentage of the idle coherence when the wind is not present. Thus, in response to determining that there is a reduction in the idle coherence, the controller 130 may proceed to determine coherence intensity at block 320. If not, however, similar to when the noise estimate is below the noise threshold in FIG. 3, the controller 130 may not perform additional operations, since there is no detected wind. In one aspect, the controller 130 may continue to monitor the idle coherence to determine the presence of wind. In another aspect, the operations performed at block 410 may be a part of the dual-channel analysis of block 315.

The diagram 400 determines the intensity of coherence 322 (at block 320) in response to the reduction of idle coherence. The controller may determine the speed of the wind based on a relationship between the coherence intensity and predefined coherence intensities that are associated with different wind speeds. For example, the controller may perform anemometer operations to determine the speed of wind 416 according to the coherence intensity 322 (at block 415). Referring again to FIG. 5, in order to determine the speed of the wind, the controller may compare a coherence intensity, with the curves 506a-506d. If one of the curves 506a-506d matches, the speed of the wind detected by the device is determined to be the wind speed that corresponds to the matching curve. If, however, none of the curves (e.g., exactly) match the coherence intensity, the speed of the wind may be based on a difference between the coherence intensity and at least one of a closest predefined curve. In another aspect, the speed of the wind may be based on the position of the intensity with respect to two of the closest predefined curves. For example, if a curve of the coherence intensity is half way between curves 506b and 506c, the corresponding wind speed may be 4 m/s. Persons skilled in the art will appreciate that any method may be used to determine a wind speed based on the comparison.

In one aspect, the speed of the wind determined from the coherence intensity curves 506a-506d may not depict an accurate representation of the wind speed with respect to the electronic device. For example, the wind speeds of graph 405 may be predetermined in a controlled setting in which wind is directed towards the speaker 110 and/or microphone 105. In real world situations, however, wind speed may be dependent on physical characteristics of the device 100, such as the orientation of the device with respect to the origin of the wind. Thus, to determine the speed of the wind, the controller may obtain sensor data 411 that indicates at least one physical characteristic of the device. For instance, the sensor data 411 may include gyroscope data obtained by a gyroscope, motion data obtained form an accelerometer, each of which is integrated into the device 100, and location-based data (e.g., GPS data). In another aspect, the sensor data may be obtained from the device or a companion device (e.g., an application executing on the device or a companion device). From this sensor data 411 the controller may determine physical characteristics of the device. For instance, when the device 100 is a wearable device that is worn by a user (e.g., a smart watch), the sensor data may indicate a velocity (or speed) at which the device is traveling (e.g., with respect to the user), a direction at which the device is traveling, and/or an orientation of the device.

Along with (or in lieu of) obtaining the sensor data, the device 100 may obtain environmental data to determine a more accurate determination of wind speed. For example, environmental data may include any information regarding the environment in which the device 100 is located that may affect the coherence measurement. For instance, environmental data may include an amount of occlusion caused by an object at least partially covering the speaker 110 and/or microphone 105. To determine occlusion, the controller may determine a frequency response between the microphone and the speaker 110. To determine the frequency response, the controller 130 may drive the speaker 110 with an audio signal that contains a stimulus sound (e.g., an impulse or suitable stimulus such as a sine sweep). The microphone 105 may capture the sound output, from which the controller 130 measures the impulse response that is converted into the frequency domain. The controller 130 may determine the amount of occlusion, which may correspond to how much the speaker 110 and/or the microphone 105 are covered by an object based on the frequency response. As another example, the environmental data may be weather data that is obtained from another application that is executing within the device 100.

From the sensor/environmental data 411, the controller 130 may adjust the wind speed determined from the coherence intensity 322. For instance, the controller 130 may perform a table lookup into a data structure that associates wind speeds (determined from the coherence intensity) with different physical characteristics (e.g., orientation, velocity, etc.) of the device 100. In another aspect, the device may perform a numerical adjustment to the determined wind speed based on the sensor data. Thus, the wind speed determined according to the sensor/environmental data 411 may be the wind speed that is relative to the device 100.

In one aspect, the device 100 may use location-based data to determine a ground wind speed (e.g., a wind speed with respect to a person standing still). For example, from the location-based data, the controller 130 may determine a direction and velocity at which the device (and a user of the device) is traveling. From this velocity, the controller 130 may determine a wind drag that may be acting in an opposite direction from which a person is traveling (e.g., based on a table lookup). The controller 130 may then subtract the wind drag from the determined wind speed in order to determine the ground wind speed.

In one aspect, the controller 130 may perform audio signal processing operations according to the determined wind speed 416 for any suitable purpose. For example, as wind speeds acting upon the microphone 105 increase, speech intelligibility will decrease. Thus, the controller 130 may perform more accurate speech enhancement algorithms based upon the wind speed 416. For instance, the controller 130 may apply different equalization filters upon the microphone signal at different wind speeds. In one aspect, the controller 130 may perform similar audio signal processing operations with respect to determining the presence of wind and determining the speed of the wind.

In another aspect, in addition to (or in lieu of) the controller 130 performing audio signal processing operations according to the determined wind speed 416 (and/or the according to the detection of wind 326) at least one processor of a companion device may perform one or more of the audio signal processing operations. For instance, the network interface 125 may transmit the wind speed data 416 and/or the control signal 325 to the companion device, which may use the data for any suitable purpose (e.g., for applications such as speech recognition algorithms, speech-to-text applications, telephony applications, etc.). In one aspect, the companion device may obtain the wind speed data 416 and/or the control signal 325 and not perform any audio signal processing operations.

In one aspect, the device 100 may alert the user of the device of the wind speed. Specifically, upon the determination of the wind speed, the device 100 may present an audible alert through a speaker (e.g., speaker 110) to the user that indicates the wind speed. As another example, the device 100 may present a visual alert through a display (not shown) of the device or a display of a companion device that is paired with the device 100. In one aspect, device may alert the user of the wind speed at predefined intervals (e.g., every two minutes). Such alerts may be beneficial for certain extracurricular activities. For instance, a bicyclist may use wind speed to determine how to hold a bicycle's handle bar in order to ride more efficiently. For example, at low speeds, the bicyclist may hold the handle bar at (or near) the brake hoods. When wind speed or headwind increases, the bicyclist will experience more wind resistance. Thus, upon being alerted that the wind speed is increasing, the bicyclist may switch hand positions to hold the handle bar at the lower curved part of the bar. This position makes the rider more aerodynamic, which will help combat the increase in wind resistance.

In one aspect, the determination of the speed of wind and/or the presence of wind may be learned through the use of a machine learning algorithm. For instance, an artificial neural network may be trained to determine the speed of wind (and/or determine the presence of wind) according to a determination of coherence between at least two signals, where one of the signals is a microphone signal and another signal is a speaker input signal. In one aspect, a neural network may be trained with multiple inputs, such as coherence, coherence intensity, and sensor data that are associated with wind speeds and/or a presence of wind.

Persons skilled in the art will appreciate that variations of diagrams 300 and 400 are possible. For example, the specific operations of the diagrams may not be performed in the exact order shown and described. The specific operations may not be performed in one continuous series of operations and different specific operations may be performed in different aspects. For instance, although operations within these diagrams are described with respect to a single speaker and a single microphone, in one aspect, these operations may be performed for more than one speaker and/or for more than one microphone.

An aspect of the present technology is the gathering and use of data available from legitimate and specific sources to detect the presence of wind. The present disclosure contemplates that in some instances, this gathered data may include personal information data that identifies or can be used to identify a specific person. Such personal information data may include location-based data, demographic data, online identifiers, telephone numbers, email addresses, home addresses, date of birth, data or records relating to a user's health or level of fitness (e.g., vital signs measurements, medication information, exercise information), or any other personal information.

The use of such personal information data, in the present technology, may be used to benefit users. For instance, personal information data, such as location-based data (e.g., GPS) may be used to detect the presence of wind and/or the speed of wind in order to improve the intelligibility of an uplink signal for a telephone call.

The present disclosure contemplates that entities responsible for the collection, analysis, disclosure, storage, transfer, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes.

Personal information from users should be collected for legitimate uses only. Further, such collection/sharing should occur only after receiving the consent of the users or other legitimate basis specified in applicable law. Moreover, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Furthermore, it is the intent of the present disclosure that personal information data should be managed and handled to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Despite the foregoing, the present disclosure also contemplates aspects in which users selectively block the access to, or use of, personal information data. Specifically, the present disclosure contemplates that hardware and/or software elements can be provided in order to block or prevent access to such personal information data. For example, the present disclosure can be configured to allow users to select to "opt in" or "opt out" of participation in the collection of personal information data at any time (e.g., during registration for any services, during initial set up of the electronic device, etc.). In another example, users can select not to provide certain data, such as location-based data. In yet another example, users can select to limit the length of time the location-based data is maintained. In addition to providing "opt in" and "opt out" options, the present disclosure contemplates providing notifications relating to the access or use of personal information. For example, a user may be notified upon downloading an app that their personal information data will be accessed and then reminded again just before personal information data is accessed by the app.

Thus, although the present disclosure may cover the use of personal information data to implement one or more various disclosed aspects, the present disclosure also contemplates that the various aspects may also be implemented without the need for gathering such personal information data. That is, the various aspects of the present disclosure are not rendered inoperable due to the lack of all or a portion of such personal information data. For instance, content can be selected and delivered to users based on aggregated non-personal information data or a bare minimum amount of personal information, such as the content being handled only on the user's device or other non-personal information available to the content delivery services As previously explained, an aspect of the disclosure may be a non-transitory machine-readable medium (such as microelectronic memory) having stored thereon instructions, which program one or more data processing components (generically referred to here as a "processor") to perform the network operations, signal processing operations, audio signal processing operations, and wind detection operations. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method for detecting wind, the method comprising:
obtaining a microphone signal produced by a microphone of an electronic device;
estimating noise contained within the microphone signal;
in response to the noise exceeding a noise threshold, activating a speaker to produce a speaker input signal;
determining a coherence between the microphone sinal and the speaker input signal;
determining whether the coherence is below a coherence intensity threshold; and
in response to determining that the coherence is below the coherence intensity threshold, determining a presence of wind in the environment.

2. The method of claim 1 further comprising applying a pre-shaped filter to the microphone signal and to the speaker input signal to cause an idle coherence over a frequency range between both signals in an absence of wind,
wherein determining whether the coherence is below the coherence intensity threshold is in response to a reduction in the idle coherence.

3. The method of claim 1, wherein determining the coherence comprises performing dual-channel analysis upon the microphone signal and the speaker input signal to determine the coherence over a frequency range.

4. The method of claim 3, wherein the frequency range is between 1-10 kHz.

5. The method of claim 3 further comprising comparing the coherence between the microphone signal and the speaker input signal over the frequency range to a predefined coherence over the frequency range to determine a difference between the coherence and the predefined coherence; and
determining a wind speed of the wind based on the difference.

6. The method of claim 5 further comprising obtaining sensor data that indicates a physical characteristic of the electronic device, wherein the wind speed of the wind is further based on the physical characteristic of the electronic device,
wherein the physical characteristic comprises at least one of a velocity at which the electronic device is traveling, a direction at which the electronic device is traveling, and an orientation of the electronic device.

7. The method of claim 1 further comprising compensating for the presence of wind in the environment by performing audio processing operations upon the microphone signal, wherein the audio processing operations comprises at least one of spectrally shaping the microphone signal and applying a gain adjustment to the microphone signal.

8. A wearable device comprising:
a microphone;
a speaker;
a processor; and
memory having stored therein instructions which when executed by the processor cause the wearable device to:
obtain a microphone signal from the microphone;
estimate noise contained within the microphone signal;
in response to the noise being above a noise threshold, activate the speaker to produce a speaker input signal;
determine a coherence between the microphone signal and the speaker input signal;
determine whether the coherence is below a coherence intensity threshold; and
in response to the coherence being below the coherence intensity threshold, determine that wind is present.

9. The wearable device of claim 8, wherein the memory stores further instructions to apply a pre-shaped filter to the microphone signal and to the speaker input signal to produce a filtered microphone signal and a filtered speaker input signal, wherein spectral content over a frequency range between both filtered signals has an idle coherence in an absence of wind,
wherein the instructions to determine whether the coherence is below the coherence intensity threshold is in response to a reduction in the idle coherence.

10. The wearable device of claim 8, wherein the instructions to determine the coherence comprises performing dual-channel analysis upon the microphone signal and the speaker input signal to determine the coherence over a frequency range.

11. The wearable device of claim 10, wherein the frequency range is between 1-10 kHz.

12. The wearable device of claim 10, wherein the memory stores further instructions to
compare the coherence between the microphone signal and the speaker input signal over the frequency range to a predefined coherence over the frequency range to determine a difference between the coherence and the predefined coherence; and
determine a wind speed of the wind based on the difference.

13. The wearable device of claim 12, wherein the memory stores further instructions to obtain sensor data that indicates a physical characteristic of the wearable device, wherein the wind speed is further based on the physical characteristic of the wearable device,
wherein the physical characteristic comprises at least one of a velocity at which the wearable device is traveling, a direction at which the wearable device is traveling, and an orientation of the wearable device.

14. The wearable device of claim 8, wherein the memory has further instructions to compensate for a presence of wind by performing audio processing operations upon the microphone signal, wherein the audio processing operations comprises at least one of spectrally shaping the microphone signal and applying a gain adjustment to the microphone signal.

15. The wearable device of claim 8, comprises a smart watch.

16. A method for detecting wind, the method comprises:
obtaining a microphone signal produced by a microphone of an electronic device;
obtaining a speaker input signal produced by a speaker of the electronic device, while the speaker is emulating a microphone;
determining a coherence between the microphone signal and the speaker input signal; and
determining a speed of wind at the microphone based on the coherence.

17. The method of claim 16 further comprising injecting coherent noise over a frequency range into the microphone signal and the speaker input signal to produce a filtered microphone signal and a filtered speaker input signal to cause an idle coherence over the frequency range between both signals in an absence of wind.

18. The method of claim 17 further comprising determining a presence of wind in response to determining that the idle coherence is below a threshold.

19. The method of claim 16, wherein determining the speed of the wind comprises comparing the coherence to a plurality of predefined coherences, each of which is associated with a particular speed of wind.

20. The method of claim 16 further comprising obtaining sensor data from at least one sensor of the electronic device that indicates a physical characteristic of the electronic device, wherein the wind speed is further based on the physical characteristic of the device,
wherein the physical characteristic comprises at least one of a velocity at which the electronic device is traveling, a direction at which the electronic device is traveling, and an orientation of the electronic device.

* * * * *